June 10, 1952 P. R. HAY 2,599,828
VALVE
Filed April 5, 1948

Inventor
Paul R. Hay
By Christy, Parmelee + Strickland
Attorneys

Patented June 10, 1952

2,599,828

UNITED STATES PATENT OFFICE 2,599,828

VALVE

Paul R. Hay, Pittsburgh, Pa.

Application April 5, 1948, Serial No. 18,890

5 Claims. (Cl. 251—64)

My invention relates to valves, particularly to valves which may be used to control the flow of liquids or gases through conduits.

It is desirable where valves are inserted either in fluid carrying mains or between mains and apparatus connected thereto such as, for example, gas washers, that the controlled fluid have free passage when the valve is in the open position, and when the valve is in the closed position it is desirable to have the valve closing member in close engagement with the valve seat so as to prevent leakage of fluid through the valve.

In larger valves, ranging in size from about three inches and above, to those in which the measurements may be expressed in feet, difficulty has been experienced in insuring fluid tight engagement between the valve disc and the valve seat, and in disengaging the valve disc from its seat. Elaborate mechanism has been provided for this purpose. A valve according to my invention requires only simple mechanism to move the valve disc out of or into engagement with the valve seat and when in the latter position to insure tight engagement with the valve seat.

My valve includes a valve seat, a valve member which member includes a valve disc and an expansible and contractable split-wedge ring member adjacent the disc, together with means for positively expanding or contracting the ring member and for moving the ring member and disc, a cam surface on the valve member, and a cooperating cam surface on the disc.

The expansion or contraction of the ring member and the movement of the valve member are controlled by the action of cables wound around the circumference of the ring member and actuated by a winch.

It is an object of my invention to provide a valve structure which is simple to construct, inexpensive to operate, is positive in operation and is easy to manipulate by hand.

A further object is to do away with cumbersome valve operating devices and to provide a simple and positively operating device which may be operated by hand.

A still further object is to provide a valve which may be adequate to handle high and low pressures, which may be operated by manpower and without complicated valve moving, and valve sealing apparatus.

In the drawings in which I have shown for purposes of illustration only the present preferred embodiment of my invention:

Figure 1:
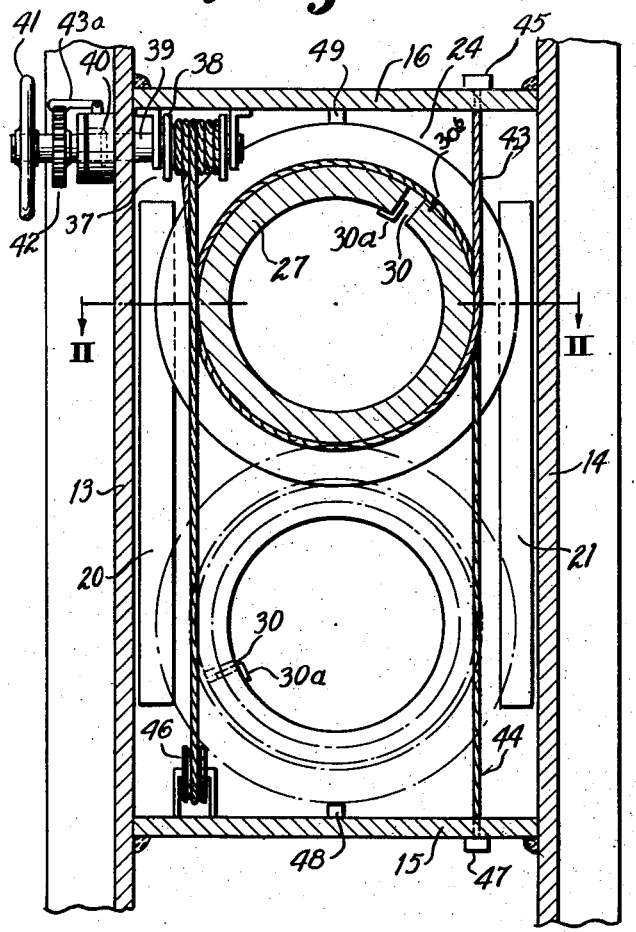
Fig. 1 is a view largely in section along the line I—I of Fig. 2.

In the drawings the numeral 10 represents a metal rectangular housing which consists of side plates 11, and 12, edge plates 13, and 14, a bottom plate 15 and a top plate 16 secured together as by welding to form a fluid-tight box having circular openings 17 and 18, in the side plates 11. This housing is here shown as welded at the edges of the side openings 17 and 18 to a fluid line or main 19 although the housing may be otherwise secured in the line 19.

Along the side plates 11 and 12 on each side of the openings 17 and 18, guide rails 20, 21, 22, and 23 are secured parallel to one another and extend from a position near the bottom plate 15 to a position near the top plate 16.

A valve member 24 is provided in the housing 10 and consists of two oppositely disposed circular valve discs 25 and 26 and a ring 27 which may also be referred to as a split ring, interposed between the discs and axially thereof. One disc 25 is disposed along side plate 11 and arranged to make a close fit with a valve seat 28 which is formed on the side plate 11 around opening 17 while the other disc 26 is disposed along the side plate 12 and arranged to make a close fit with a valve seat 29 which is formed in the side 12 around opening 18.

The split ring 27 which has cam surfaces on its outer periphery is made of resilient metal and comprises a short cylindrical body having a longitudinal slot 30 which extends through the ring 27. In the slot, stops 30a are disposed, one being secured to disc 25, the other being secured to disc 26. When free from compressive forces the cross section of the ring 27 is as shown in the full lined ring adjacent the top of Fig. 1. Upon the application of forces employed in closing and sealing the valve openings the ring may be compressed until the edges of slot 30 bears almost but preferably not wholly against the stops 30a as the broken line view of the valve adjacent the bottom of Fig. 1. The reason for leaving a small slot when the valve is tightly closed is to insure that the forces employed in valve closing, as will be explained later, will be expended against the valve discs as to insure fluid-tight joints between the valve discs 25 and 26 and their respective valve seats 28 and 29.

Each of the circular valve discs 25 and 26 are formed of a desirable material such as bronze, cast iron or stainless steel and shaped as shown to resemble somewhat a railroad car wheel with a tread 31 and flange 32. The diameter of each of the discs as well as the dimensions of the tread and the flange are such that the disc 25 movably fits between the guide rails 20 and 21, and the disc 26 fits between guide 22 and 23. On the inside of each disc and near the periphery is an inwardly sloping cam surface 33 and on the inside of the flange a cam surface 34 parallel to surface 33 is provided. The cam surface 33 co-operates with a cam surface 35 on ring 27 and the cam surface 34 co-operates with a cam surface 36 on ring 27. By this arrangement of cam surfaces the valve discs will be axially moved toward the valve seats by the action of cam surface 35 sliding inwardly along cam surface 33 which is caused by the contraction of ring 27. When the ring 27 expands the cam surface 36 on ring 27 slides outwardly along cam surface 34 on the flange 32 and forces the discs 25 and 26 away from the corresponding valve seats 28 and 29.

In assembling the valve member, the discs 25 and 26 are axially assembled adjacent the ends of the ring member 27. The ring member is then compressed so as to cause both sides of the slot 30 to bear against the stop 30a whereupon the diameter of the outer end edges of the ring will be such that the inner part of the flanges 32 may be slid over the outer end edges of the ring. Upon release of the compressure forces, the ring 27 will expand and the cam surfaces 36 on ring 27 will slide along the cam surfaces 34, and the cam surfaces 35 along the cam surfaces 33 and thus engage the ring 27 and discs 25 and 26.

A winding winch 37 is attached near the center of the top plate 16 adjacent to the side plate 13 as shown in Fig. 1. The winch includes a winding drum 38 mounted on a shaft 39 which extends through the side plate 13, through a fluid-tight gland 40 and terminates in a squared end which may receive a winding wheel 41. Pinned to the shaft 39 between the gland 40 and the wheel 41 is a notched wheel 42. A wheel latch 43a is mounted on the gland 40 and when dropped in a notch of wheel 42 will hold the shaft 39 against rotation.

Wound around the drum 38 are two steel cables, a lifting cable 43 and a closing cable 44 wound oppositely to each other. Cable 43 extends around the ring 27 and at the first turn is pinned at 30b to the ring 27 adjacent one end of the slot 30. One end of cable 43 is secured to an anchor 45 in the top plate 15. The cable 44 extends through a pulley 46 attached to the bottom plate 16 of the housing, thence around ring 27 and is secured to an anchor 47 in the bottom plate 15. The purpose of the cable 43 is to move the valve member 24 from the closed position, covering the openings 17 and 18 to the open position where the valve is wholly clear of the openings 17 and 18 or to any position intermediate the closed and open positions. The reason for pinning cable 43 to the ring 27 is to ensure that the ring 27 will expand when a lifting stress is placed on cable 43. The resiliency of the ring and the lifting force will cause the ring to open, since one end of the ring is held immovable relative to discs 25 and 26 by the stop 30a. A stop 48 on the bottom plate 15 against which the flanges 32 of the valve discs 25 and 26 rest limits the downward travel of the discs and insures alignment of the discs with their respective openings. Stop 49 attached to top plate 15 limits the opposite travel.

Figure 3:
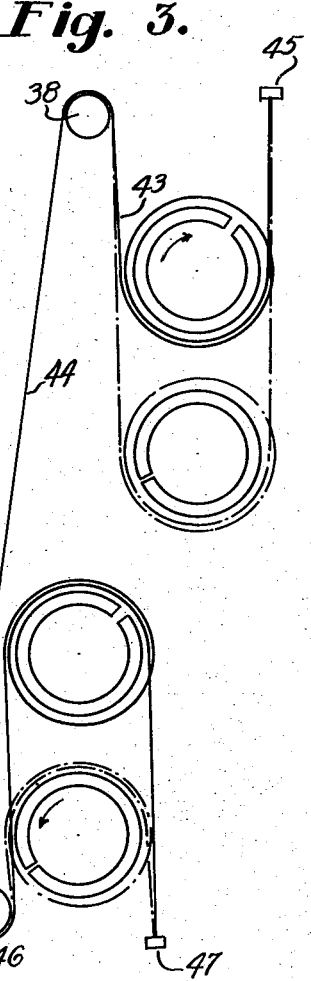
Fig. 3 is a schematic view showing the operating cables and valve member.
Figure 2:
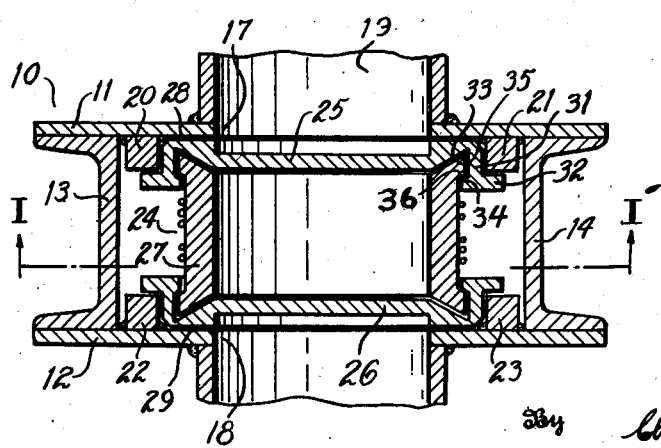
Fig. 2 is a view in section along the line II—II of Fig. 1.

When it is desired to open the valve partly or wholly, the latch 43a is lifted from the wheel 42 which releases drum 38 and the closing cable 44 is slackened to permit the wedge member 27 to expand and by co-operation of the cam surfaces 34 and 36 the discs 25 and 26 are axially moved away from their respective valve seats and toward each other. Further movement of the winding drum 38 winds up lifting cable 43, insures that the ring 27 expands and causes closing cable 44 to be paid out, whereupon the valve member 24 is moved away from the closed position. While moving from the closed position toward the open position, the valve member rolls clockwise along guide rails as shown in Fig. 3. While moving toward the closed position the valve member 24 rolls counter clockwise as indicated in the lower part of Fig. 3 which schematically shows the cable action in moving the valve member to the closed position, while the upper portion of Fig. 3 shows the valve member moving to open position.

The housing may be placed at any angle, though I have here shown it as vertically disposed. It is obvious that power means could be used for turning the winch, if it is desirous to employ power.

The various parts may be formed from the metal which best suits the designer. Many of the parts may be made of cast metal if desired. The metals that may be used for example, cast iron, cast steel, bronze, wrought or rolled metal, stainless steel, etc.

While I have described the presently preferred embodiment of my invention it may be otherwise embodied with the scope of the following claims.

I claim:

1. In a valve, a housing having an opening therein, a valve member movable in the housing, the valve member including an expansible and contractible ring and a disc axially thereof adjacent the housing, a pair of axially spaced cam surfaces on said ring, a pair of axially spaced cam surfaces on said disc respectively for co-operation with one of said ring cam surfaces to provide two sets of cooperating cam surfaces for moving said disc in opposite axial directions relative to said ring, and means for positively expanding and contracting said ring to thereby render said sets of cam surfaces operable to move said disc in opposite directions.

2. In a valve, a housing having an opening therein, a valve member movable in the housing, the valve member including an expansible and contractible ring and a disc axially thereof adjacent the housing, a pair of axially spaced cam surfaces on said ring, a pair of axially spaced cam surfaces on said disc respectively for cooperation with one of said ring cam surfaces to provide two sets of cooperating cam surfaces for moving said disc in opposite axial directions relative to said ring, means for contracting said ring to render one of said sets of cam surfaces operable to move said disc in one of said directions, and means for expanding said ring to render the other of said sets of cam surfaces operable to move said disc in the other of said directions.

3. In a valve, a housing having an opening therein, a valve member movable in the housing, the valve member including an expansible and contractible ring and a disc axially thereof adjacent the housing, a pair of axially spaced cam surfaces on said ring, a pair of axially spaced cam surfaces on said disc respectively for cooperation with one of said ring cam surfaces to provide two sets of cooperating cam surfaces for moving said disc in opposite axial directions relative to said ring, and means including a cable reeled on said ring for positively expanding and contracting said ring by a reeling movement of the cable to thereby render said sets of cam surfaces operable to move said disc in opposite directions.

4. In a valve, a housing having an opening therein, a valve member movable in the housing, the valve member including an expansible and contractible ring and a disc axially thereof adjacent the housing, a pair of axially spaced cam surfaces on said ring, a pair of axially spaced cam surfaces on said disc respectively for cooperation with one of said ring cam surfaces to provide two sets of cooperating cam surfaces for moving said disc in opposite axial directions relative to said ring, and means including a cable having portions thereof reeled on said ring in opposite directions, reeling movement of said cable in one direction being effective through one of said cable portions to contract said ring and render one of said sets of cam surfaces operable to move said disc in one axial direction, and reeling movement of said cable in an opposite direction being effective through the other of said cable portions to expand said ring and render the other of said sets of cam surfaces operable to move said disc in an opposite axial direction.

5. In a valve, a housing having an opening therein, a valve member movable in the housing to and from positions opening and closing said opening, said valve member including a disc for sealing engagement with the housing about said opening and an expansible and contractible ring arranged axially of said disc, and means for operating said valve member including a cable reeled on said ring for moving said valve member in said housing with a rolling motion and for contracting said ring to effect sealing engagement of said disc when it is in a position closing said opening.

PAUL R. HAY.

REFERENCES CITED

The following references are of record in the file of this patent:

UNITED STATES PATENTS

| Number | Name | Date |
|---|---|---|
| 808,561 | Millholland | Dec. 26, 1905 |

FOREIGN PATENTS

| Number | Country | Date |
|---|---|---|
| 2,469 | Great Britain | of 1877 |
| 17,559 | Great Britain | of 1889 |